(12) United States Patent
Murrow

(10) Patent No.: US 11,084,595 B2
(45) Date of Patent: Aug. 10, 2021

(54) VTOL VEHICLE WITH FAN BLADES OUTSIDE OF EXHAUST FLOWPATH

(71) Applicant: General Electric Company, Schenectady, NY (US)

(72) Inventor: Kurt David Murrow, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 296 days.

(21) Appl. No.: 16/042,487

(22) Filed: Jul. 23, 2018

(65) Prior Publication Data

US 2019/0023391 A1 Jan. 24, 2019

Related U.S. Application Data

(60) Provisional application No. 62/535,444, filed on Jul. 21, 2017.

(51) Int. Cl.
*B64D 27/24* (2006.01)
*B64C 29/00* (2006.01)
(Continued)

(52) U.S. Cl.
CPC ............... *B64D 27/24* (2013.01); *B64C 3/10* (2013.01); *B64C 3/32* (2013.01); *B64C 3/38* (2013.01);
(Continued)

(58) Field of Classification Search
CPC .......... B64D 27/14; B64D 27/20; B64C 1/16; B64C 29/0025
See application file for complete search history.

(56) References Cited

U.S. PATENT DOCUMENTS 2,558,501 A * 6/1951 Turner, Jr. ............... B64C 1/16
244/67
3,083,935 A 4/1963 Piasecki
(Continued)

FOREIGN PATENT DOCUMENTS

DE 202015003815 U1 7/2015
DE 202016005012 U1 9/2016
(Continued)

OTHER PUBLICATIONS

European Search Report Corresponding to EP Application No. 181848904 dated Sep. 24, 2018.

*Primary Examiner* — Joseph W Sanderson
(74) *Attorney, Agent, or Firm* — Dority & Manning, P.A.

(57) ABSTRACT

An aircraft defining a vertical direction and a transverse direction. The aircraft may include a fuselage, a wing extending from the fuselage, and a hybrid-electric propulsion system. The hybrid-electric propulsion system may include a power source, a plurality of vertical thrust electric fans arranged along the wing and driven by the power source, and a forward thrust propulsor. The power source may include a combustion engine and an electric generator. The combustion engine may also define a flowpath for exhausting combustion gases. The forward thrust propulsor may be selectively or permanently mechanically coupled to the combustion engine. The forward thrust propulsor may include a propulsor fan having a plurality of fan blades arranged outside of the flowpath of the combustion engine for exhausting combustion gases.

20 Claims, 8 Drawing Sheets

(51) Int. Cl.

| | | |
|---|---|---|
| *B64D 29/04* | (2006.01) | |
| *B64C 3/10* | (2006.01) | |
| *B64D 27/08* | (2006.01) | |
| *B64C 3/32* | (2006.01) | |
| *B64D 35/02* | (2006.01) | |
| *B64C 3/38* | (2006.01) | |
| *B64D 33/04* | (2006.01) | |
| *B64D 31/06* | (2006.01) | |
| *B64D 27/02* | (2006.01) | |
| *B64D 27/26* | (2006.01) | |
| *H02K 7/18* | (2006.01) | |

(52) U.S. Cl.
CPC .......... *B64C 29/0025* (2013.01); *B64D 27/08* (2013.01); *B64D 29/04* (2013.01); *B64D 31/06* (2013.01); *B64D 33/04* (2013.01); *B64D 35/02* (2013.01); *B64D 27/02* (2013.01); *B64D 27/26* (2013.01); *B64D 2027/026* (2013.01); *F05D 2220/76* (2013.01); *F05D 2270/093* (2013.01); *H02K 7/1823* (2013.01)

(56) References Cited

U.S. PATENT DOCUMENTS

| | | | |
|---|---|---|---|
| 3,117,748 A * | 1/1964 | Gerlaugh | B64C 29/0016 244/15 |
| 3,128,970 A | 4/1964 | Tinajero et al. | |
| 3,161,374 A | 12/1964 | Allred et al. | |
| 3,194,516 A * | 7/1965 | Messerschmitt | B64D 27/20 244/74 |
| 3,206,929 A | 9/1965 | Marchant et al. | |
| 3,212,731 A | 10/1965 | Kappus | |
| 3,220,669 A | 11/1965 | Lewis et al. | |
| 3,249,323 A | 5/1966 | Vanderlip | |
| 3,312,448 A * | 4/1967 | Huil, Jr. | F16C 33/76 415/175 |
| 3,388,878 A | 6/1968 | Peterson et al. | |
| 3,499,620 A | 3/1970 | Haberkorn et al. | |
| 3,618,875 A | 11/1971 | Kappus | |
| 3,762,667 A | 10/1973 | Pender | |
| 4,371,133 A * | 2/1983 | Edgley | B64C 11/001 244/13 |
| 4,469,294 A | 9/1984 | Clifton | |
| 4,789,115 A | 12/1988 | Koutsoupidis | |
| 4,828,203 A | 5/1989 | Clifton et al. | |
| 5,054,716 A | 10/1991 | Wilson | |
| 5,141,176 A | 8/1992 | Kress et al. | |
| 5,209,428 A | 5/1993 | Bevilaqua et al. | |
| 5,312,069 A | 5/1994 | Bollinger et al. | |
| 5,320,305 A | 6/1994 | Oatway et al. | |
| 5,542,625 A | 8/1996 | Burhans, Jr. et al. | |
| 5,758,844 A | 6/1998 | Cummings | |
| 5,765,777 A | 6/1998 | Schmittle | |
| 5,769,317 A | 6/1998 | Sokhey et al. | |
| 6,036,142 A | 3/2000 | Yates | |
| 6,270,037 B1 | 8/2001 | Freese et al. | |
| 6,729,575 B2 | 5/2004 | Bevilaqua | |
| 6,860,449 B1 | 3/2005 | Chen | |
| 6,892,980 B2 | 5/2005 | Kawai | |
| 7,104,499 B1 | 9/2006 | Arata | |
| 7,114,685 B1 | 10/2006 | Schulein | |
| 7,249,734 B2 | 7/2007 | Yurkovich | |
| 7,410,122 B2 | 8/2008 | Robbins et al. | |
| 7,412,825 B2 | 8/2008 | Muylaert | |
| 7,665,689 B2 | 2/2010 | McComb | |
| 7,735,774 B2 | 6/2010 | Lugg | |
| 7,806,362 B2 | 10/2010 | Yoeli | |
| 7,857,253 B2 | 12/2010 | Yoeli | |
| 7,857,254 B2 | 12/2010 | Parks | |
| 7,866,598 B2 | 1/2011 | Waide et al. | |
| 8,016,226 B1 | 9/2011 | Wood | |
| 8,128,019 B2 | 3/2012 | Annati et al. | |
| 8,336,806 B2 | 12/2012 | Dierksmeier | |
| 8,408,490 B2 | 4/2013 | McDonnell | |
| 8,622,335 B2 | 1/2014 | Yoeli | |
| 8,757,538 B2 | 6/2014 | Siefert | |
| 8,915,467 B2 | 12/2014 | Narasimha et al. | |
| 9,010,693 B1 | 4/2015 | Barbieri | |
| 9,085,355 B2 | 7/2015 | DeLorean | |
| 9,132,915 B2 | 9/2015 | Zhu | |
| 9,227,721 B1 | 1/2016 | Nguyen | |
| 9,278,753 B2 | 3/2016 | Reckzeh et al. | |
| 9,327,822 B1 | 5/2016 | Melton et al. | |
| 9,481,457 B2 | 11/2016 | Alber | |
| 9,637,217 B2 * | 5/2017 | Marrinan | B64D 29/04 |
| 9,676,479 B2 | 6/2017 | Brody et al. | |
| 9,682,774 B2 | 6/2017 | Paduano et al. | |
| 9,702,254 B2 * | 7/2017 | Saiz | B64C 29/0083 |
| 9,731,818 B2 | 8/2017 | Dekel et al. | |
| 9,815,560 B2 * | 11/2017 | Marrinan | B64D 29/04 |
| 9,821,917 B2 * | 11/2017 | Becker | B64D 27/14 |
| 9,884,687 B2 * | 2/2018 | Marrinan | B64D 29/04 |
| 9,957,055 B2 * | 5/2018 | Marrinan | B64D 27/10 |
| 10,000,293 B2 * | 6/2018 | Hamel | B64D 27/18 |
| 10,017,270 B2 * | 7/2018 | Becker | B64D 27/20 |
| 10,082,040 B2 * | 9/2018 | Gallet | F02C 3/10 |
| 10,106,265 B2 * | 10/2018 | Yao | B64C 7/02 |
| 10,435,163 B2 * | 10/2019 | Gallet | B64D 27/14 |
| 10,710,735 B2 * | 7/2020 | Murrow | B64C 3/32 |
| 10,723,470 B2 * | 7/2020 | Suciu | B64D 27/14 |
| 10,737,797 B2 * | 8/2020 | Murrow | B64D 33/04 |
| 2003/0062442 A1 * | 4/2003 | Milde, Jr. | B64C 29/0025 244/12.3 |
| 2003/0080242 A1 | 5/2003 | Kawai | |
| 2005/0133662 A1 | 6/2005 | Magre | |
| 2012/0091257 A1 | 4/2012 | Wolff et al. | |
| 2012/0280091 A1 | 11/2012 | Saiz | |
| 2013/0251525 A1 * | 9/2013 | Saiz | B64C 27/30 416/23 |
| 2014/0060004 A1 | 3/2014 | Mast et al. | |
| 2015/0274289 A1 | 10/2015 | Newman et al. | |
| 2015/0291285 A1 * | 10/2015 | Gallet | B64D 27/20 415/60 |
| 2015/0314865 A1 | 11/2015 | Bermond et al. | |
| 2016/0167780 A1 | 6/2016 | Giovenga | |
| 2016/0214710 A1 | 7/2016 | Brody et al. | |
| 2016/0214727 A1 * | 7/2016 | Hamel | B64C 21/06 |
| 2016/0332741 A1 * | 11/2016 | Moxon | B64D 33/02 |
| 2016/0333822 A1 | 11/2016 | Roberts | |
| 2016/0347447 A1 | 12/2016 | Judas et al. | |
| 2017/0029131 A1 * | 2/2017 | Steinwandel | B64C 39/024 |
| 2017/0057631 A1 | 3/2017 | Fredericks et al. | |
| 2017/0081013 A1 * | 3/2017 | Marrinan | F02K 3/04 |
| 2017/0081034 A1 * | 3/2017 | Marrinan | B64D 33/02 |
| 2017/0081035 A1 * | 3/2017 | Becker | B64D 27/20 |
| 2017/0081036 A1 * | 3/2017 | Marrinan | B64D 33/02 |
| 2017/0081037 A1 * | 3/2017 | Marrinan | B64C 21/06 |
| 2017/0101191 A1 * | 4/2017 | Becker | B64D 27/18 |
| 2017/0121029 A1 | 5/2017 | Blyth et al. | |
| 2017/0159674 A1 | 6/2017 | MacIolek | |
| 2017/0197709 A1 | 7/2017 | Fink et al. | |
| 2017/0197711 A1 | 7/2017 | King et al. | |
| 2017/0203839 A1 | 7/2017 | Giannini et al. | |
| 2017/0234447 A1 | 8/2017 | Jennings et al. | |
| 2017/0240274 A1 | 8/2017 | Regev | |
| 2017/0327219 A1 | 11/2017 | Alber | |
| 2018/0030852 A1 * | 2/2018 | Tantot | B64D 27/20 |
| 2018/0141652 A1 * | 5/2018 | Deslypper | B64C 39/12 |
| 2018/0209294 A1 * | 7/2018 | Gallet | B64D 27/20 |
| 2018/0209445 A1 * | 7/2018 | Tantot | F01D 17/162 |
| 2018/0230945 A1 * | 8/2018 | Romano | F04D 29/542 |
| 2018/0281979 A1 * | 10/2018 | Reigner | B64D 35/06 |
| 2018/0354634 A1 * | 12/2018 | Jodet | F02C 7/24 |
| 2019/0023390 A1 * | 1/2019 | Murrow | B64D 27/08 |
| 2019/0023408 A1 * | 1/2019 | Murrow | B64D 31/06 |
| 2019/0047680 A1 * | 2/2019 | Murrow | B64C 3/32 |
| 2019/0047681 A1 * | 2/2019 | Murrow | B64D 31/06 |
| 2019/0047716 A1 * | 2/2019 | Murrow | B64D 35/02 |
| 2019/0047717 A1 * | 2/2019 | Murrow | B64C 3/32 |
| 2019/0047718 A1 * | 2/2019 | Murrow | B64C 3/38 |

(56) References Cited

U.S. PATENT DOCUMENTS

2019/0047719 A1\* 2/2019 Murrow ............. B64C 29/0025
2019/0061964 A1\* 2/2019 Murrow ................ B64D 27/24

FOREIGN PATENT DOCUMENTS

ES            2288083 A1    12/2007
WO    WO 2016181044 A1    11/2016

\* cited by examiner

VTOL VEHICLE WITH FAN BLADES OUTSIDE OF EXHAUST FLOWPATH

RELATED APPLICATION

The present application is based upon and claims priority to U.S. Provisional Patent Application Ser. No. 62/535,444, filed on Jul. 21, 2017.

FIELD

The present subject matter relates generally to a propulsion system for an aircraft having vertical takeoff and landing capabilities.

BACKGROUND

Aircraft have been developed with a capability for performing vertical takeoff and landings. Such a capability may allow for the aircraft to reach relatively rugged terrains and remote locations, where it may be impractical or infeasible to construct a runway large enough to allow for a traditional aircraft (lacking vertical takeoff capability) to takeoff or land.

Typically these aircraft capable of performing vertical takeoff and landings have engines and propulsors that are vectored to generate both vertical thrust and forward thrust. However, the design characteristics that make a propulsor efficient for vertical takeoff and landing may not result in efficient forward flight. Accordingly, existing aircraft capable of performing vertical takeoff and landing include propulsors that may be well suited for generating vertical thrust, but that may not be very well suited for efficient forward flight. This discrepancy between vertical takeoff and landing and cruise efficiency is exaggerated as cruise speed increases. An aircraft capable of more efficiently performing a vertical takeoff and landing combined with high speed cruise would therefore be useful.

BRIEF DESCRIPTION

Aspects and advantages will be set forth in part in the following description, or may be obvious from the description, or may be learned through practice of the invention.

In one aspect, the present disclosure is directed to an aircraft defining a vertical direction and a transverse direction. The aircraft includes a fuselage, a wing extending from the fuselage, and a hybrid-electric propulsion system. The hybrid electric propulsion system includes a power source, a plurality of vertical thrust electric fans arranged along the wing and driven by the power source, and a forward thrust propulsor. The power source includes a combustion engine and an electric generator. The combustion engine also defines a flowpath for exhausting combustion gases. The forward thrust propulsor is selectively or permanently mechanically coupled to the combustion engine. The forward thrust propulsor includes a propulsor fan having a plurality of fan blades arranged outside of the flowpath of the combustion engine for exhausting combustion gases.

In one embodiment, the combustion engine may include a casing defining an exterior surface. Further, the plurality of fan blades of the propulsor fan may be arranged outside the exterior surface of the casing of the combustion engine. In another embodiment, the forward thrust propulsor may be configured as a variable pitch propulsor. In such an embodiment, the forward thrust propulsor may include an outer nacelle at least partially defining a fan air flowpath and further including a pitch change mechanism. The pitch change mechanism may be positioned inward of the fan air flowpath and outward of the flowpath of the combustion engine. In a further embodiment, the combustion engine may define an outlet positioned inward of the fan blades in a substantially radial direction and downstream, aft, or both of the fan blades in a substantially axial direction. In another embodiment, the fan blades may be positioned aft, downstream, or both of a turbine section of the combustion engine along an axial direction.

In another embodiment, the variable pitch propulsor may define a pitch range enabling the forward thrust propulsor to generate forward thrust, reverse thrust, and substantially no thrust during operation. In one exemplary embodiment, the combustion engine may be a turboshaft engine. In such an embodiment, the turboshaft engine may include an output shaft. Further, the forward thrust propulsor may include a fan shaft selectively or permanently mechanically coupled to the output shaft. In one embodiment, the forward thrust propulsor may be mounted to the fuselage of the aircraft at an aft end of the aircraft. In another embodiment, the hybrid-electric propulsion system may further include a coupling unit. Further, the combustion engine may be selectively mechanically coupled to the forward thrust propulsor through the coupling unit.

In another embodiment, the hybrid-electric propulsion system may further include a speed change mechanism. As such, the combustion engine may be mechanically coupled to the forward thrust propulsor through the speed change mechanism. In additional embodiments, the power source may further include an electric energy storage unit. In such embodiments, each of the plurality of vertical thrust electric fans may be electrically coupled to and driven by at least one of the electric generator or the electric energy storage unit. In one exemplary embodiment, the power source may further include an electric motor electrically coupled to and driven by the electric energy storage unit. Further, the electric motor may be coupled to and configured to drive the forward thrust propulsor.

In additional embodiments, the plurality of vertical thrust electric fans may be integrated into the wing and fixed in orientation to generate thrust along the vertical direction. In one particular embodiment, the wing may be a first wing. Further, the plurality of vertical thrust electric fans may be a first plurality of vertical thrust electric fans. In such embodiments, the aircraft may further include a second wing coupled to and extending from the fuselage. The hybrid-electric propulsion system may further include a second plurality of vertical thrust electric fans integrated into the second wing and oriented to generate thrust along the vertical direction. As such, the second plurality of vertical thrust electric fans may be arranged along a length of the second wing.

In another embodiment, the wing may be a first wing, and the plurality of vertical thrust electric fans of the hybrid electric propulsion system may be a first plurality of vertical thrust electric fans. In such an embodiment, the aircraft may further include a second wing, a third wing, and a fourth wing. Further, the hybrid electric propulsion system may further include a second plurality of vertical thrust electric fans integrated into the second wing and arranged along a length of the second wing, a third plurality of vertical thrust electric fans integrated into the third wing and arranged along a length of the third wing, and a fourth plurality of vertical thrust electric fans integrated into the fourth wing and arranged along a length of the fourth wing. As such, each of the second plurality of vertical thrust electric fans, the third plurality of vertical thrust electric fans, and fourth plurality of vertical thrust electric fans may be oriented to generate thrust along the vertical direction. It should be further understood that the aircraft may further include any of the additional features as described herein.

In another aspect, the present disclosure is directed to a hybrid-electric propulsion system for an aircraft including a power source, a plurality of vertical thrust electric fans, and a forward thrust propulsor. The power source includes a combustion engine and an electric generator. The power source includes a combustion engine defining a flowpath for exhausting combustion gases. The plurality of vertical thrust electric fans are driven by the power source. The forward thrust propulsor is selectively or permanently mechanically coupled to the combustion engine and includes a propulsor fan having a plurality of fan blades. Further, the plurality of fan blades of the propulsor fan are arranged outside of the flowpath of the combustion engine for exhausting combustion gases.

In one embodiment, the combustion engine may include a casing defining an exterior surface. Further, the plurality of fan blades of the propulsor fan may be arranged outside the exterior surface of the casing of the forward thrust propulsor. In another embodiment, the forward thrust propulsor may be configured as a variable pitch propulsor including at least one pitch change mechanism. As such, the variable pitch propulsor may define a pitch range enabling the forward thrust propulsor to generate forward thrust, reverse thrust, and substantially no thrust during operation.

These and other features, aspects, and advantages will become better understood with reference to the following description and appended claims. The accompanying drawings, which are incorporated in and constitute a part of this specification, illustrate embodiments of the invention and, together with the description, serve to explain certain principles of the invention. It should be further understood that the hybrid-electric propulsion system may further include any of the additional features as described herein.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
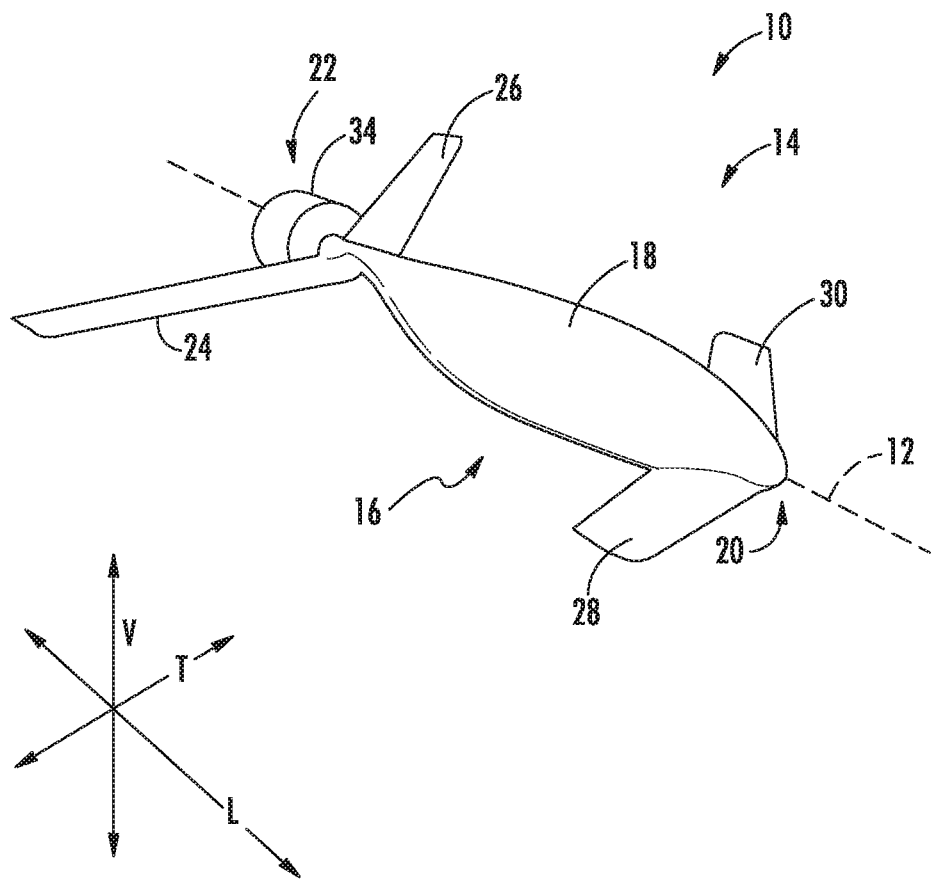
FIG. 1 is a perspective view of an aircraft according to various exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

An aircraft is generally provided capable of performing vertical takeoff and landing. The aircraft defines a vertical direction and a transverse direction. More specifically, the aircraft includes a fuselage, a wing coupled to and extending from the fuselage, and a hybrid-electric propulsion system. As such, the hybrid-electric propulsion system includes a power source, a plurality of vertical thrust electric fans, and a forward thrust propulsor. The power source includes a combustion engine and an electric generator. The combustion engine defines a flowpath for exhausting combustion gases. Further, the plurality of vertical thrust electric fans are arranged along a length of the wing and driven by the power source. The forward thrust propulsor is selectively or permanently mechanically coupled to the combustion engine. Furthermore, the forward thrust propulsor includes a propulsor fan having a plurality of fan blades. More specifically, the plurality of fan blades is arranged outside of the flowpath of the combustion engine for exhausting combustion gases.

A vertical takeoff and landing aircraft having a forward thrust propulsor mechanically coupled to a combustion engine in accordance with one or more embodiments of the present disclosure may allow for a more robust and efficient coupling of the forward thrust propulsor to the combustion engine, while still allowing for desired amount of control of the amount of forward thrust generated by the forward thrust propulsor. Arranging the propulsor fan blades outside of the flowpath of the engine exhaust may ensure the operation of the forward thrust propulsor is not negatively affected by the engine exhaust. Furthermore, such a placement of the forward thrust propulsor may allow for smoother flow to the propulsor fan blades and may therefore lead to a more efficient aircraft.

Figure 2:
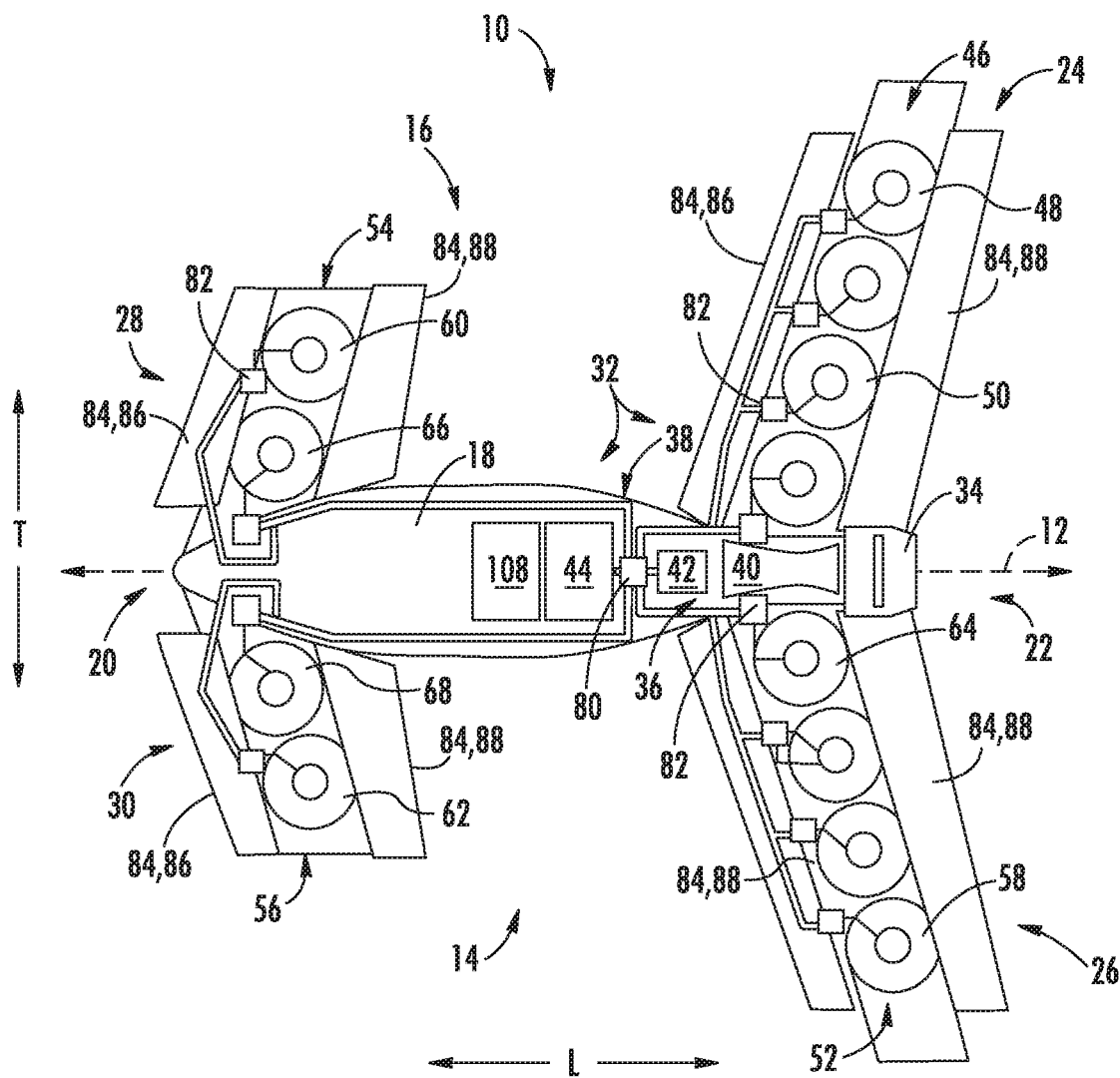
FIG. 2 is a top, schematic view of the exemplary aircraft of FIG. 1 in a vertical flight position.
Figure 3:
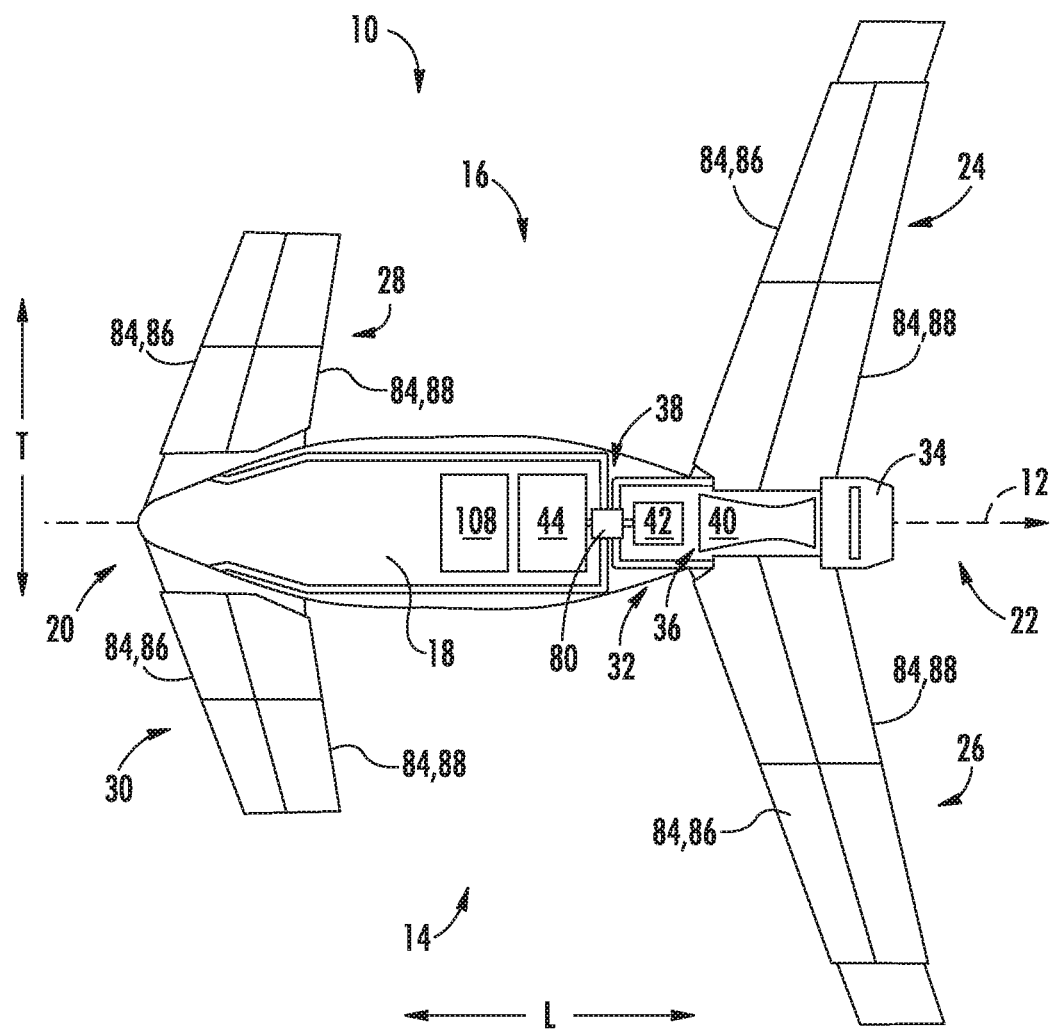
FIG. 3 is a top, schematic view of the exemplary aircraft of FIG. 1 in a forward flight position.

Referring now to the drawings, wherein identical numerals indicate the same elements throughout the Figures ("Figs."), FIGS. 1 through 3 depict an aircraft 10 in accordance with various embodiments of the present disclosure. More specifically, FIG. 1 provides a perspective view of the exemplary aircraft 10; FIG. 2 provides a top, schematic view of the exemplary aircraft 10 of FIG. 1 in a vertical thrust configuration; and FIG. 3 provides a top, schematic view of the exemplary aircraft 10 of FIG. 1 in a forward thrust configuration. As shown in FIGS. 1 through 3 collectively, the aircraft 10 defines a longitudinal direction L (and a longitudinal centerline 12 that extends therethrough), a vertical direction V, and a transverse direction T. Additionally, the aircraft 10 defines a port side 14 and an opposite starboard side 16.

The aircraft 10 includes a fuselage 18 extending between a forward end 20 and an aft end 22 generally along the longitudinal centerline 12 of the aircraft 10. The aircraft 10 additionally includes a four wings, each attached to or formed integrally with the fuselage 18. Specifically, for the embodiment depicted, the aircraft 10 includes a first wing, a second wing, a third wing, and a fourth wing, or more particularly an aft starboard wing 24, an aft port wing 26, a forward starboard wing 28, and a forward port wing 30. Each of these wings 24, 26, 28, 30 is attached to, or formed integrally with, the fuselage 18 and extends from the fuselage 18 outwardly generally along the transverse direction T (i.e., outwardly relative to the fuselage 18). It will be appreciated that although the forward port wing 30 and forward starboard wing 28 are depicted as being separate wings, in other embodiments, the forward port wing 30 and forward starboard wing 28 may be formed integrally, and together attached to the fuselage 18. Similarly, although the aft port wing 26 and aft starboard wing 24 are depicted as being separate wings, in other embodiments, the aft port wing 26 and aft starboard wing 24 may be formed integrally, and together attached the fuselage 18.

Although not depicted, in other embodiments, the aircraft 10 may additionally include one or more stabilizers, such as one or more vertical stabilizers, horizontal stabilizers, etc. Moreover, although not depicted, in certain embodiments, one or more of the wings may additionally include flaps, such as leading-edge flaps or trailing edge flaps, for assisting with controlling the aircraft 10 during flight.

Referring still to FIGS. 1 through 3, the exemplary aircraft 10 further includes a hybrid-electric propulsion system 32 for providing the aircraft 10 with a desired amount of thrust during operation. Broadly speaking, the exemplary hybrid-electric propulsion system 32 includes a plurality of vertical thrust electric fans (or "VTE fans") for generating vertical thrust during operation, a forward thrust propulsor 34, and a power source 36 for driving the plurality of VTE fans and the forward thrust propulsor 34. Additionally, for the embodiment depicted, the hybrid-electric propulsion system 32 includes an electric communication bus 38 for, e.g., providing electrical power from the power source 36 to the plurality of VTE fans.

More specifically, for the embodiment depicted, the power source 36 includes a combustion engine 40, an electric machine 42, and an electric energy storage unit 44. As will be described in greater detail below with reference to FIG. 6, the combustion engine 40 is configured to mechanically drive the forward thrust propulsor 34. More specifically, the forward thrust propulsor 34 is selectively or permanently mechanically coupled to the combustion engine 40. Additionally, the combustion engine 40 is coupled to the electric machine 42. Accordingly, in at least certain embodiments, the combustion engine 40 may drive the electric machine 42 such that the electric machine 42 may generate electrical power. In such a manner, the electric machine 42 may be configured as an electric generator. Further, in such an exemplary embodiment, the electric machine 42 may provide the electrical power to, e.g., the plurality of VTE fans during at least certain operations of the aircraft 10, to the electric energy storage unit 44, or both. In such a manner, the plurality of VTE fans may be driven by the power source 36, and, more particularly, may be driven at least in part by the electric machine 42.

Referring particularly to FIGS. 2 and 3, the electric energy storage unit 44 may be a battery or other suitable component for storing electrical power. The electric energy storage unit 44 may receive electrical power from, e.g., the electric machine 42 (operating as an electric generator), and store electrical power for use during operation of the aircraft 10. For example, the electric energy storage unit 44 may receive and store electrical power from the electric machine 42 (operating as an electric generator) during certain operations and subsequently provide electrical power to the plurality of VTE fans during other operations. Additionally, in still other operations, the electric energy storage unit 44 may provide electrical power back to the electric machine 42 to, e.g., power the aft fan for short durations, power the combustion engine 40 during emergency operations, or add power to the forward thrust propulsor 34 and/or to the combustion engine 40 during high power demand operations. Accordingly, with such exemplary embodiments, the electric machine 42 may further be configured as an electric motor.

Referring to a first of the plurality of wings of the aircraft 10, and more particularly to the aft starboard wing 24 depicted in FIG. 2, the hybrid-electric propulsion system 32 includes a first plurality of VTE fans 46 integrated into the aft starboard wing 24 and oriented to generate thrust along the vertical direction V. In such a manner, each of the first plurality of VTE fans 46 are vertical lift fans and, as will be discussed in more detail below, are fixed in position such that they are only capable of generating thrust substantially along the vertical direction V of the aircraft 10. As will be discussed in greater detail below, each of the first plurality of VTE fans 46 is electrically coupled to the power source 36 to receive electrical power from, e.g., the electric machine 42 or the electric energy storage unit 44.

It will be appreciated, that as used herein, the term "along the vertical direction V of the aircraft 10" refers to a vertical direction defined by a normal orientation of the aircraft 10. For example, if the aircraft 10 is, e.g., tilted forward during certain operations, the first plurality of VTE fans 46 may provide thrust in a direction that is still along the vertical direction of the aircraft 10, but tilted relative to absolute vertical direction. Additionally, in this context, the term "substantially" refers to being within about thirty degrees of the vertical direction V of the aircraft 10.

Additionally, the first plurality of VTE fans 46 are arranged along a length of the aft starboard wing 24 generally along the transverse direction T. Additionally, the first plurality of VTE fans 46 includes an outermost VTE fan 48 along the transverse direction T relative to the fuselage 18 of the aircraft 10 and at least one interior VTE fan 50. More particularly, for the embodiment of FIG. 2, the first plurality of VTE fans 46 includes three interior VTE fans 50. However, in other embodiments, the first plurality of VTE fans 46 may have any other suitable number of interior fans, as will be discussed in more detail below. It will be appreciated that the outermost VTE fan 48 is at least one of a variable pitch fan or a variable speed fan to provide increased stability to the aircraft 10. For example, in certain embodiments, the outermost VTE fan 48 may be a variable pitch and variable speed fan. As will be appreciated, by changing a pitch of a plurality of fan blades of the outermost VTE fan 48, an amount of thrust generated by the outermost VTE fan 48 may be modified without requiring any change to a rotational speed of the outermost VTE fan 48.

It will further be appreciated that the hybrid-electric propulsion system 32 includes a similar plurality of vertical thrust electric fans integrated into the other wings 26, 28, 30 of the aircraft 10. Each of these electric fans are similarly oriented to generate thrust substantially along the vertical direction V of the aircraft 10, and in such a manner may therefore also be configured as VTE fans. More specifically, the hybrid-electric propulsion system 32 further includes a second plurality of VTE fans 52 integrated into the aft port wing 26 and arranged along a length of the aft port wing 26, a third plurality of VTE fans 54 integrated into the forward starboard wing 28 and arranged along a length of the forward starboard wing 28, and a fourth plurality of VTE fans 56 integrated into the forward port wing 30 and arranged along a length of the forward port wing 30.

As with the first plurality of VTE fans 46, the second plurality of VTE fans 52 includes an outermost VTE fan 58 along the transverse direction T. Additionally, the third plurality of VTE fans 54 also includes an outermost VTE fan 60 along the transverse direction T, and the fourth plurality of VTE fans 56 includes an outermost VTE fan 62 along the transverse direction T. The outermost VTE fans 58, 60, 62 of the second plurality of VTE fans 52, of the third plurality of VTE fans 54, and of the fourth plurality of VTE fans 56, respectively, are similarly configured as one of a variable pitch fan or a variable speed fan. More particularly, for the embodiment of FIG. 2, each of such outermost VTE fans 58, 60, 62 are configured as variable pitch fans. Accordingly, each of such outermost VTE fans 58, 60, 62 may be configured in substantially the same manner as the outermost VTE fan 48 of the first plurality of VTE fans 46 (see, e.g., FIGS. 4 and 5).

With reference back to the first plurality of VTE fans 46, for the embodiment of FIG. 2, at least one of the interior VTE fans 50 of the first plurality of VTE fans 46 is configured differently than the outermost VTE fan 48. More specifically, for the embodiment depicted, the interior VTE fans 50 of the first plurality of VTE fans 46 are each configured as fixed pitch fans, while the outermost VTE fan 48 is configured as a variable pitch fan (discussed above). Such a configuration may allow at least some of the first plurality of VTE fans 46 to have a simpler configuration, while the first plurality of VTE fans 46 may still provide a desired amount of stability for the aircraft 10 due to the inclusion of a variable pitch outermost VTE fan 48.

Similarly, the second plurality of VTE fans 52 includes at least one interior VTE fan 64, the third plurality of VTE fans 54 includes at least one interior VTE fan 66, and the fourth plurality of VTE fans 56 includes at least one interior VTE fan 68. More specifically, the second plurality of VTE fans 52 includes three interior VTE fans 64, the third plurality of VTE fans 54 includes one interior VTE fan 66, and the fourth plurality of VTE fans 56 also includes one interior VTE fan 68. For the embodiment depicted, each of the at least one interior VTE fans 64, 66, 68 of the respective pluralities of VTE fans 52, 54, 56 is configured differently than the outermost VTE fan 58, 60, 62 of the respective pluralities of VTE fans 52, 54, 56.

It will be appreciated, however, that in other exemplary embodiments, each of the respective pluralities of VTE fans 46, 52, 54, 56 may have any other suitable number of interior VTE fans 50, 64, 66, 68. Further, in certain exemplary embodiments, the at least one interior VTE fan 50, 64, 66, 68 of each plurality of VTE fans 46, 52, 54, 56 may be configured in the same manner as the outermost VTE fans 48, 58, 60, 62 of the respective plurality of VTE fans 52, 54, 56. For example, in other exemplary embodiments, each of the first plurality of VTE fans 46, second plurality of VTE fans 52, third plurality of VTE fans 54, and fourth plurality of VTE fans 56 may be configured as variable speed, fixed pitch fans, or alternatively, may each be configured as variable speed, variable pitch fans (the "variable speed" functionality described below).

Moreover, as is depicted in FIG. 2, the electric communication bus 38 electrically connects the power source 36, e.g., the electric machine 42 and/or the electric energy storage unit 44, to each of the pluralities of VTE fans 46, 52, 54, 56. Notably, for the embodiment depicted, the electric communication bus 38 includes a main controller 80 and a plurality of electric power controllers 82. The main controller 80 is electrically connected to both the electric machine 42 and the electric energy storage unit 44 and is configured to, e.g., direct electrical power from one or both of the electric machine 42 and electric energy storage unit 44 to each of the pluralities of VTE fans 46, 52, 54, 56. For example, in certain operations, the main controller 80 may direct electrical power from the electric machine 42 to each of the pluralities of VTE fans 46, 52, 54, 56, may direct electrical power from the electric energy storage unit 44 to each of the pluralities of VTE fans 46, 52, 54, 56, may direct electrical power from the electric machine 42 to the electric energy storage unit 44 (e.g., during forward flight), or may direct electrical power from the electric energy storage unit 44 to the electric machine 42 (e.g., during emergency operations or high power demand operations). Other operations are contemplated as well.

In the exemplary embodiment of FIG. 2, the electric communication bus 38 includes an electric power controller 82 for each VTE fan (i.e., each VTE fan of the first plurality of VTE fans 46, of the second plurality of VTE fans 52, of the third plurality of VTE fans 54, and of the fourth plurality of VTE fans 56). Additionally, each of the plurality of electric power controllers 82 is associated with one VTE fan of the pluralities of VTE fans 46, 52, 54, 56. More specifically, still, the power source 36 is electrically coupled to each VTE fan of the pluralities of VTE fans 46, 52, 54, 56 through the respective electric power controller 82. In such a manner, the electric power controller 82 may modify the electric power provided from the power source 36 to each respective VTE fan. Accordingly, for the embodiment shown, the hybrid-electric propulsion system 32 includes twelve electric power controllers 82, one for each of the twelve VTE fans included within the hybrid-electric propulsion system 32.

In certain exemplary embodiments, each of the electric power controllers 82 may be one or more of a power converter, a power inverter, or a power transformer. Accordingly, in certain exemplary embodiments, the electric power controllers 82 may be configured to convert electrical power received through the electric communication bus 38 from alternating current ("AC") electrical power to direct current ("DC") electrical power, or vice versa. Further, the electric power controllers 82 may be configured in at least certain embodiments to modify an amount of the electrical power (e.g., a voltage or a current) received through the electric communication bus 38 from the power source 36 before transferring such electrical power to a respective VTE fan.

Accordingly, in at least certain embodiments, each of the electric power controllers 82 may modify an amount of electrical power provided to a respective VTE fan, which may allow for the aircraft 10, and more specifically, may allow for the main controller 80, to modify a rotational speed of each VTE fan of the pluralities of VTE fans 46, 52, 54, 56. For example, each of the electric power controllers 82 may be operably coupled to the main controller 80 through, e.g., a wired or wireless communication bus (not shown), such that the main controller 80 may control the electrical power provided to each of the individual VTE fans.

Accordingly, it will be appreciated that in at least certain embodiments each VTE fan of the pluralities of VTE fans 46, 52, 54, 56 may be variable speed fans. Accordingly, by modifying an amount of electrical power provided to each VTE fan through a respective electric power controller 82, the aircraft 10 may modify a rotational speed of the respective VTE fan, and therefore an amount of vertical thrust provided by the respective VTE fan. In such a manner, the aircraft 10 may allow for more dynamic control during vertical takeoff and landing, or other vertical thrust operations.

It should be appreciated, however, that in other exemplary embodiments, the aircraft 10, or rather, the electric communication bus 38 may not include an electric power controller 82 for each of the individual VTE fans. Instead, for example, in other embodiments, the electric communication bus 38 may include a single electric power controller 82 for each of the individual pluralities of VTE fans 46, 52, 54, 56. In still other embodiments, however, any other suitable configuration may be provided.

Moreover, as briefly stated above, and as is shown in FIGS. 2 and 3, each of the wings 24, 26, 28, 30 are fixed wings including a variable control portion that is generally movable between a vertical thrust position (FIG. 2) and a forward thrust position (FIG. 3). More specifically, referring now also to FIGS. 4 and 5, providing a side, cross-sectional view of the aft starboard wing 24 and an interior VTE fan 50 of the first plurality of VTE fans 46, the aft starboard wing 24 (as well as the other wings 26, 28, 30, discussed in more detail below) generally includes a variable geometry portion 84. The variable geometry portion 84 is movable between a forward thrust position (FIG. 4), one or more transitional positions (not shown), and a vertical thrust position (FIG. 5), and further is generally formed of a surface portion of the respective wings 24, 26, 28, 30. As will be appreciated, however, a main body or frame portion of the wings 24, 26, 28, 30 remain stationary during this movement.

When the variable geometry portion 84 is moved from the forward thrust position to the vertical thrust position, the first plurality of VTE fans 46 are exposed. By contrast, when the variable geometry portion 84 is moved from the vertical thrust position to the forward thrust position, the first plurality of VTE fans 46 are substantially completely covered. For the embodiment depicted, the variable geometry portion 84 forms a lift fan exhaust arrangement for the first plurality of VTE fans 46 when moved to the vertical thrust position. It will be appreciated, that as used herein, the term "exhaust arrangement" refers generally to any structure located downstream of the respective fan configured to channel at least a portion of an airflow from the respective fan to increase a power loading (i.e., a ratio of thrust produced to an amount of power received) of such fan. For example, the exhaust arrangement may be configured generally as a nozzle or diffuser for the respective fans.

More specifically, for the embodiment depicted, the aft starboard wing 24, or rather, the variable geometry portion 84 of the aft starboard wing 24, generally includes a forward section 86 and an aft section 88. Referring back briefly to FIGS. 2 and 3, it will be appreciated that for the embodiment shown, the forward section 86 and the aft section 88 of the variable geometry portion 84 each extend from the innermost VTE fan of the first plurality of VTE fans 46 to the outermost VTE fan 48 of the first plurality of VTE fans 46. In such a manner, when the variable geometry portion 84 is moved to the vertical thrust position, the exhaust arrangement formed by the variable geometry portion 84 also extends from the innermost VTE fan of the first plurality of VTE fans 46 to the outermost VTE fan 48 of the first plurality of VTE fans 46.

Figure 4:
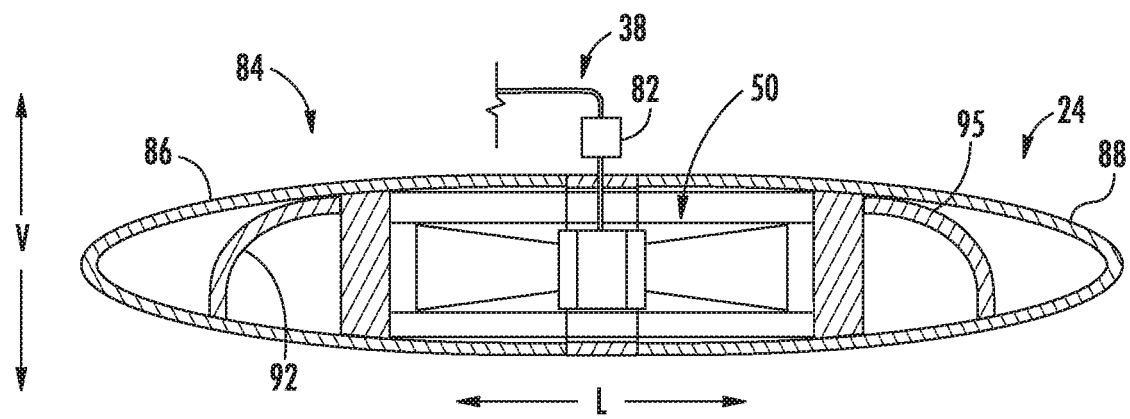
FIG. 4 is a side, schematic view of a wing in accordance with an exemplary embodiment of the present disclosure as may be incorporated into the exemplary aircraft of FIG. 1 in a forward flight position.
Figure 5:
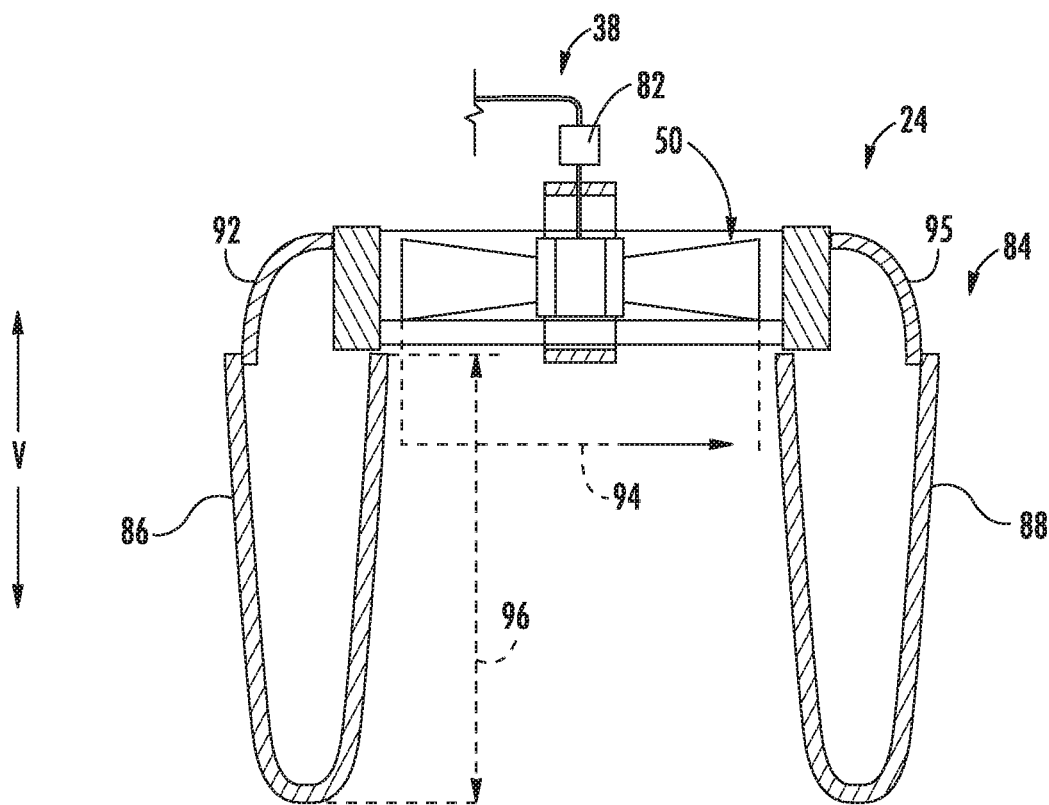
FIG. 5 is a side, schematic view of the exemplary wing of FIG. 4 in a vertical flight position.

Referring particularly to FIG. 4, when the variable geometry portion 84 of the aft starboard wing 24 is in the forward thrust position, the forward section 86 and the aft section 88 together define at least in part an airfoil cross-sectional shape. Such may allow for relatively efficient forward flight for the aircraft 10. By contrast, however, as is depicted in FIG. 5, when the variable geometry portion 84 of the aft starboard wing 24 is moved to the vertical thrust position, the forward section 86 and the aft section 88 of the variable geometry portion 84 together form the exhaust arrangement. For example, in certain exemplary embodiments, the forward section 86 may be mounted on a forward track 92 within the aft starboard wing 24 such that when it is moved from the forward thrust position to the vertical thrust position it translates forward along the lateral direction and pivots downward along the vertical direction V to the position shown in FIG. 5. Similarly, the aft section 88 may be mounted on an aft track 95 within the aft starboard wing 24 such that when it is moved from the forward thrust position to the vertical thrust position it translates aft along the lateral direction and pivots downward along the vertical direction V to the position shown in FIG. 5.

It will be appreciated that each of the first plurality of VTE fans 46 define a fan diameter 94, and for the embodiment depicted (see FIG. 2), the fan diameter 94 of each of the plurality of VTE fans is substantially the same. Further, the exhaust arrangement formed by the variable geometry portion 84 of the aft starboard wing 24 defines a length 96 along the vertical direction V. For the embodiment depicted, the length 96 is equal to, or greater than the fan diameter 94 of each VTE fan of the first plurality of VTE fans 46. More specifically, for the embodiment depicted, the length 96 is at least about ten percent greater the fan diameter 94 of each VTE fan of the first plurality of VTE fans 46. For example, in at least certain embodiments, the length 96 may be at least about fifteen percent greater, such as at least about twenty-five percent greater, such as at least about fifty percent greater than the fan diameter 94 of each VTE fan of the first plurality of VTE fans 46, and may be less than or equal to ten times the fan diameter 94 of each VTE fan.

It will additionally be appreciated that each of the remaining wings 26, 28, 30 may similarly include a variable geometry portion 84 movable between a forward thrust position and a vertical thrust position, wherein such variable geometry portion 84 forms an exhaust arrangement when in the vertical thrust position. It will be appreciated, however, that in other exemplary embodiments, the variable geometry portion 84 of each wings 24, 26, 28, 30 may have any other suitable configuration for forming an exhaust arrangement for each respective plurality of VTE fans 46, 52, 54, 56 integrated therein.

It will further be appreciated that inclusion of wings 24, 26, 28, 30 having a variable geometry portion 84 for forming an exhaust arrangement for each of the pluralities of VTE fans 46, 52, 54, 56 may allow for higher efficiency VTE fans at a given fan diameter. Or, alternatively, each of the pluralities of VTE fans 46, 52, 54, 56 may be smaller than would otherwise be required to generate a necessary amount of vertical thrust for the aircraft 10 to perform vertical takeoffs, vertical landings, and general hover maneuvers.

Further, with the inclusion of the distributed VTE fans along the length of the respective wings 24, 26, 28, 30 in the manner described herein, combined with the increased efficiency allowed by the exhaust arrangements formed by the respective wings 24, 26, 28, 30, each of the wings 24, 26, 28, 30 may define a higher aspect ratio than conventionally possible for a fan-in-wing configuration, providing for relatively efficient forward flight. It will be appreciated, that as used herein, the term "aspect ratio," with reference to one or more of the wings 24, 26, 28, 30, generally refers to a ratio of the wing's span to its mean chord. Inclusion of wings configured in such a manner may allow for an overall more efficient aircraft 10.

Moreover, as briefly noted above, the hybrid-electric propulsion system 32 is configured as a hybrid-electric propulsion system including the power source 36 (the power source 36 having the combustion engine 40 and the electric machine 42) and the forward thrust propulsor 34, with the forward thrust propulsor 34 selectively or permanently mechanically coupled to the combustion engine 40 of the power source 36. More specifically, referring now to FIG. 6, a simplified view is provided of the exemplary combustion engine 40 of the power source 36 of the hybrid-electric propulsion system 32 described above with reference to FIGS. 1 through 3. For the embodiment depicted, the combustion engine 40 is a turboshaft engine. The turboshaft engine includes in serial flow order, a compressor section including a low pressure compressor 98 and a high pressure compressor 100, a combustion section 102, and a turbine section including a high pressure turbine 104 and a low pressure turbine 106. During operation, a flow of air 74 is received within the compressor section and is progressively compressed as it flows therethrough, i.e., as it flows from the low pressure compressor 98 to the high pressure compressor 100. The compressed air is then provided to the combustion section 102 where it is mixed with fuel and burned to generate hot combustion gas 76. The aircraft 10 further includes a fuel tank 108 for providing the fuel to the combustion section 102 (see FIGS. 2 and 3).

The hot combustion gas 76 is expanded through the turbine section where rotational energy is extracted therefrom. Specifically, the hot combustion gas rotates the high pressure turbine 104 and the low pressure turbine 106 as the gas flows therethrough and is expanded. These components may be enclosed within a casing, e.g., the fuselage 18 of the aircraft 10 or a casing 19 of the combustion engine 40. The hot combustion gas 76 may be exhausted, e.g., to atmosphere, from the low pressure turbine 106, as will be discussed in more detail below. Notably, the compressor sections 98, 100; combustion section 102; and turbine sections 104, 106 together define a core air flowpath 75 through the combustion engine 40.

Also for the embodiment depicted, the high pressure turbine 104 is connected to the high pressure compressor 100 through a high pressure shaft or spool 112, such that a rotation of the high pressure turbine 104 additionally rotates the high pressure compressor 100. Similarly, the low pressure turbine 106 is connected to the low pressure compressor 98 through a low pressure shaft or spool 114, such that rotation of the low pressure turbine 106 additionally rotates the low pressure compressor 98.

Figure 6:
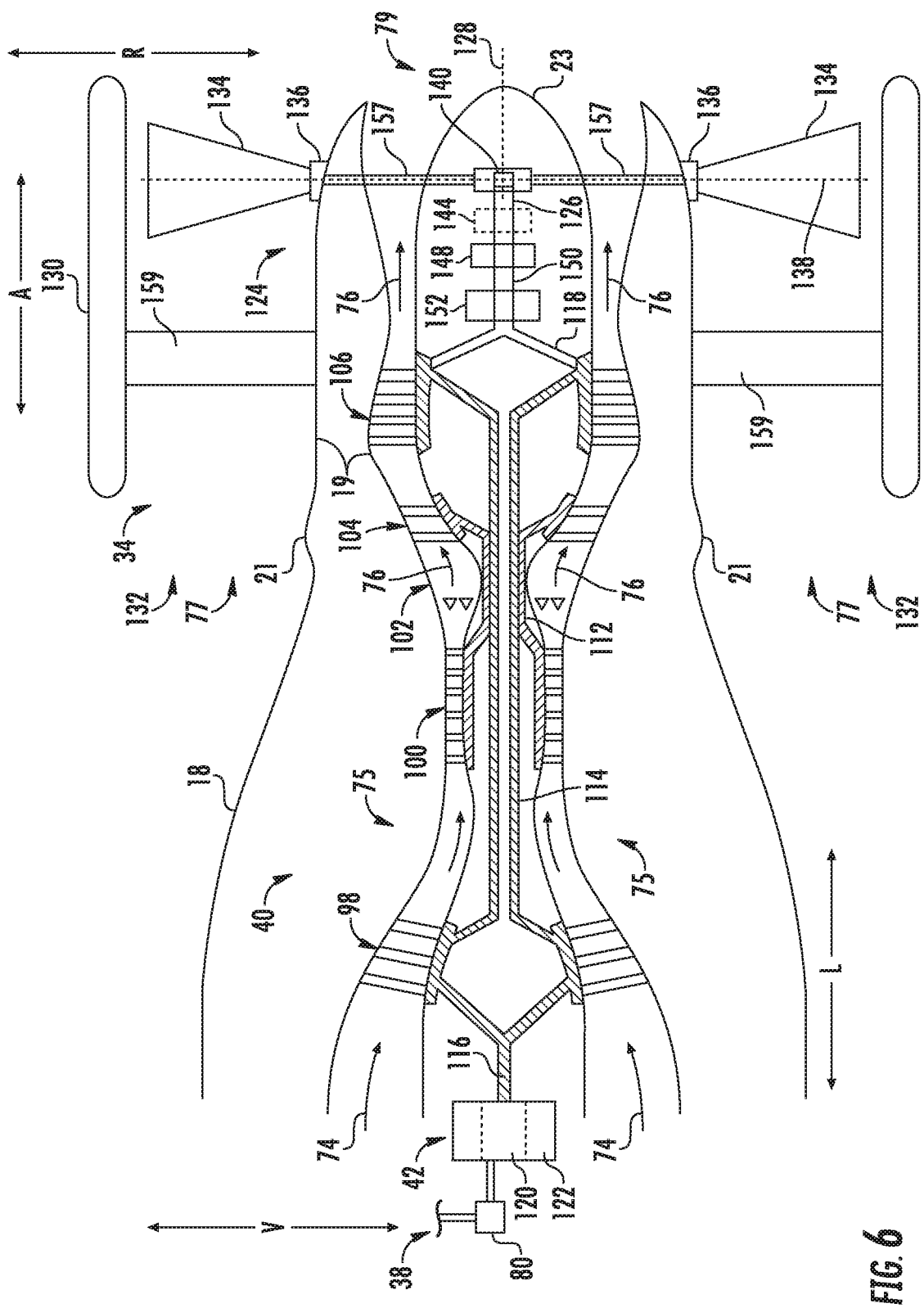
FIG. 6 is a schematic view of a power source of the exemplary aircraft of FIG. 1.

It will be appreciated, however, that the exemplary turboshaft engine depicted in FIG. 6 is provided by way of example only. In other exemplary embodiments, the turboshaft engine may have any other suitable configuration. For example, in other embodiments, the turboshaft engine may include any other suitable number of compressors and/or any other suitable number of turbines. Further, in still other embodiments, the combustion engine may be any other suitable combustion engine, such as a rotary or internal combustion engine.

Referring still to FIG. 6, the low pressure shaft 114 additionally drives an output shaft. More specifically, for the embodiment of FIG. 6, the low pressure shaft 114 additionally drives a first output shaft, or a forward output shaft 116, of the turboshaft engine and further drives a second output shaft, or an aft output shaft 118 of the turboshaft engine. The forward output shaft 116 extends to the electric machine 42. Accordingly, rotation of the turboshaft engine provides, at least during certain operations, rotational energy to the electric machine 42 via the forward output shaft 116. The electric machine 42, in turn, is configured to convert the rotational energy to generate electrical power. More specifically, it will be appreciated that at least certain embodiments of the electric machine 42, such as the embodiment shown, may generally include a rotor 120 and a stator 122. The rotational energy of the turboshaft engine is provided via the forward output shaft 116 and configured to rotate the rotor 120 of the electric machine 42 relative to the stator 122. Such relative movement may generate electrical power.

Inclusion of a turboshaft engine and electric machine 42 in accordance with such an exemplary embodiment may allow for the electric power source 36 to generate a relatively high amount of electric power and to provide such electric power to the plurality of VTE fans of the hybrid-electric propulsion system 32.

Figure 7:
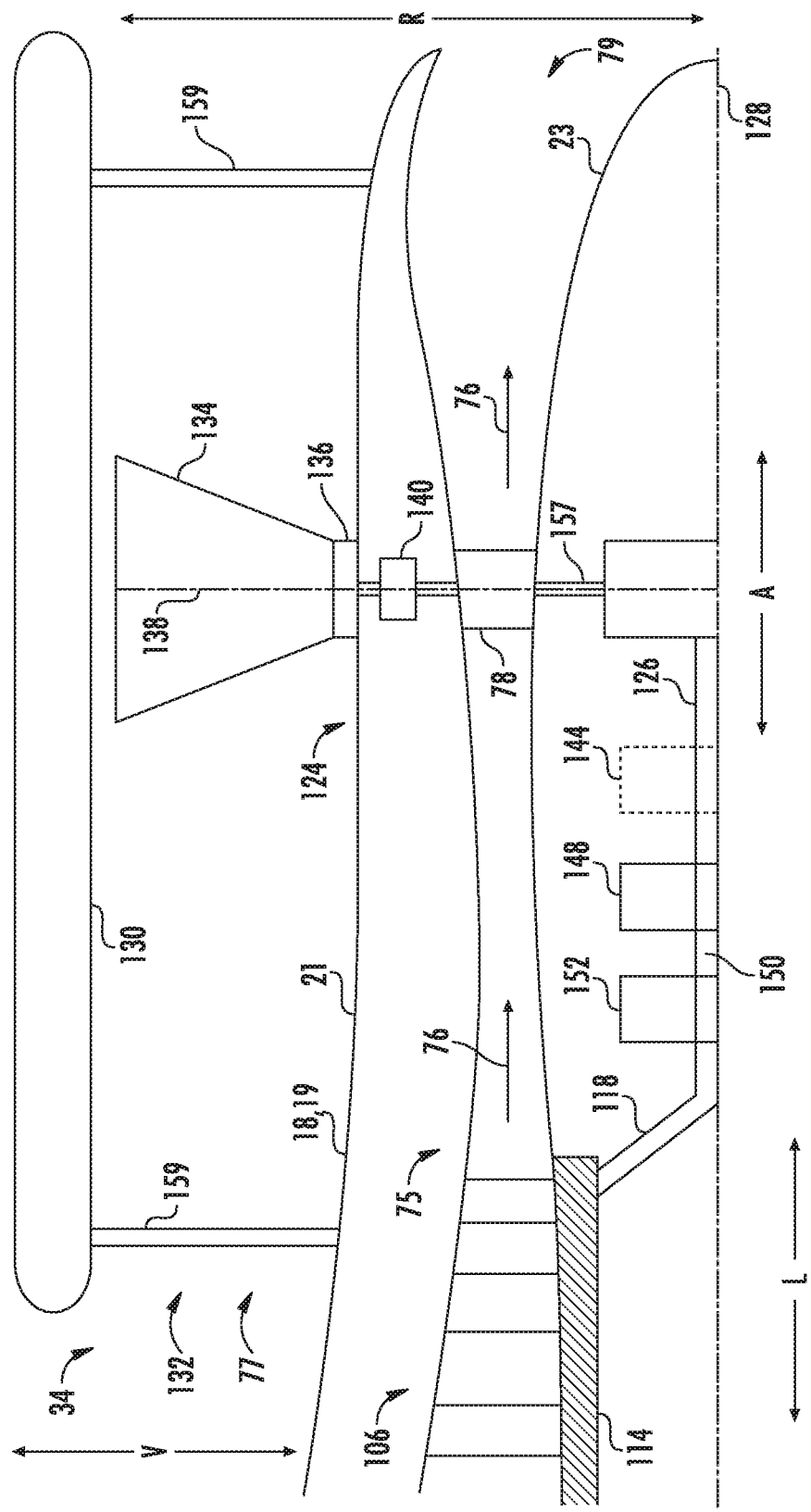
FIG. 7 is an exemplary, schematic view of a forward thrust propulsor configured as a ducted fan.
Figure 8:
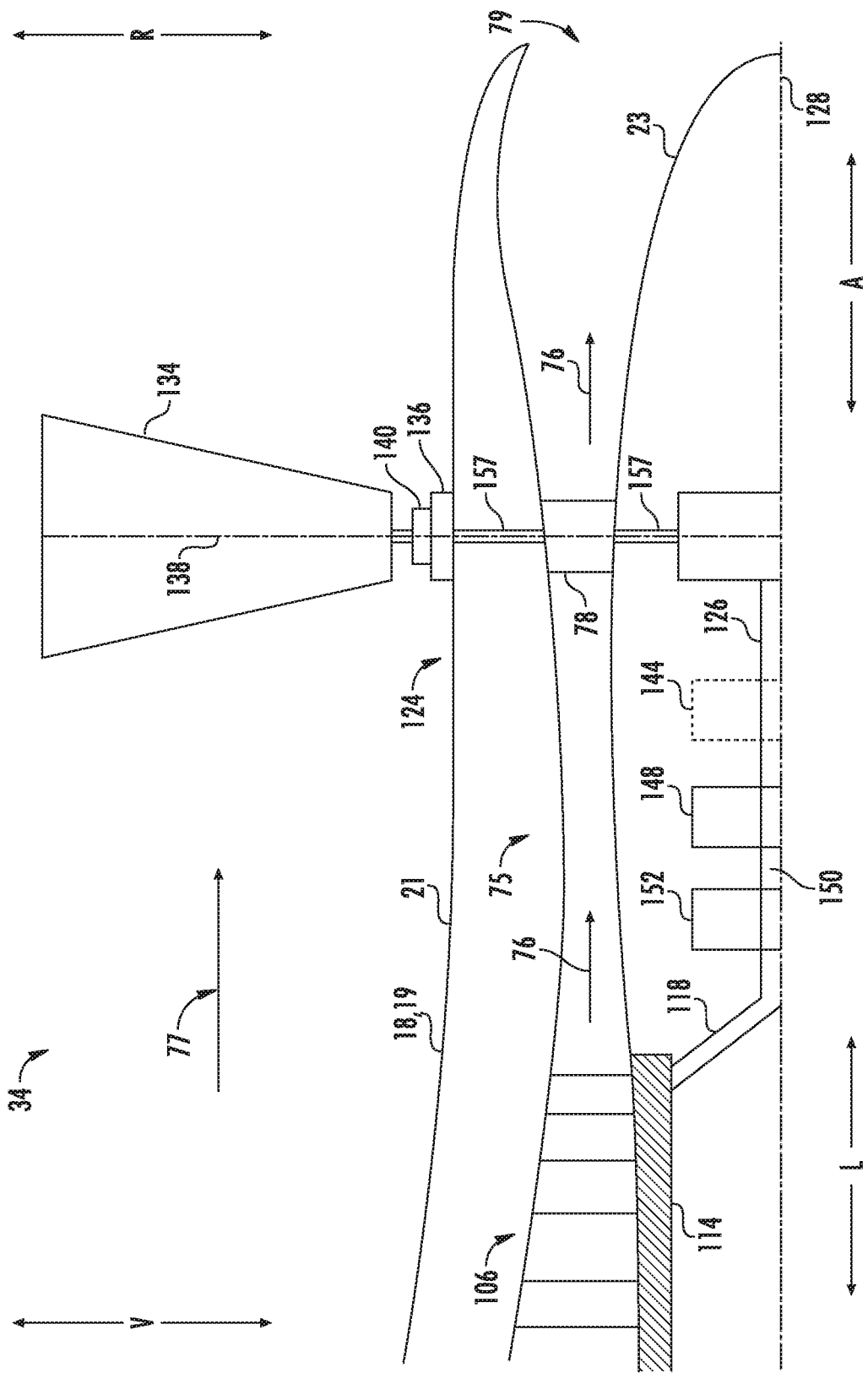
FIG. 8 is an exemplary, schematic view of a different forward thrust propulsor configured as a non-ducted fan.

Referring now to FIGS. 6 through 8, FIG. 7 shows a simplified view of a ducted forward propulsor 34, and FIG. 8 shows a simplified view of non-ducted forward propulsor 34. As shown and previously discussed, the combustion engine 40 further drives the forward thrust propulsor 34 of the hybrid-electric propulsion system 32. For the embodiments depicted, the forward thrust propulsor 34 includes a propulsor fan 124 coupled to a fan shaft 126. The aft output shaft 118 of the turboshaft engine is selectively mechanically coupled to, or permanently mechanically coupled to, the fan shaft 126 to allow the turboshaft engine to drive the propulsor fan 124. More specifically, during operation, the aft output shaft 118 of the turboshaft engine may drive the fan shaft 126 to rotate the propulsor fan 124 about a fan axis 128. Referring particularly to FIGS. 6 and 7, the forward thrust propulsor 34 may further include an outer casing or outer nacelle 130 surrounding at least a portion of the fan 124. In such a manner, the forward thrust propulsor 34 may be referred to as a ducted fan. Contrarily, the forward thrust propulsor 34 may not include the outer nacelle 130, as seen in FIG. 8, and may be referred to as a non-ducted fan.

It will be appreciated, that as used herein, the term "permanently mechanically coupled to," with reference to the fan shaft 126 and output shaft 118 refers to a coupling that does not allow for the output shaft 118 to be decoupled from, or otherwise freely rotatable relative to, the fan shaft 126 during operation, such as flight operations, of the aircraft 10.

Still referring to FIG. 6 through 8, it will be appreciated that the exemplary hybrid-electric propulsion system 32 depicted further includes a coupling unit 148, with the turboshaft engine selectively mechanically coupled to the forward thrust propulsor 34 through the coupling unit 148. The coupling unit 148 may be at least one of a clutch or a torque converter. More specifically, for the embodiment depicted, the coupling unit 148 includes a clutch, and more specifically, includes a one-way clutch. For example, in certain embodiments, the one-way clutch may be a sprag clutch.

Further, in certain exemplary embodiments, as is depicted in phantom, the forward thrust propulsor 34 may additionally include a drive electric machine 144, or rather, a drive motor, coupled to the fan shaft 126. The drive electric machine 144 may be electrically coupled to the power source 36, such as to one or more of the electric machine 42 or electric energy storage unit 44, through the electric communication bus 38 (see FIG. 2). The drive electric machine 144 may receive electrical power to drive the propulsor fan 124 of the forward thrust propulsor 34 during, e.g., emergency operations, or in a noise and/or emission sensitive environment. Inclusion of a one-way clutch in the coupling unit 148, such as a sprag clutch, may allow for the drive electric machine 144 to rotate the propulsor fan 124 without having to correspondingly rotate the combustion engine 40 (i.e., turboshaft for the embodiment depicted).

It should be recognized that, in other embodiments, the hybrid-electric propulsion system 32 may not include a direct mechanical coupling between the combustion engine 40 and the propulsor fan 124. For example, at least the propulsor fan 124 by itself or the compulsory fan and a combination of the all or some of the VTE fans may be entirely electrically driven. For instance, the electric machine 144 may drive the propulsor fan 124 via power supplied by the electric energy storage unit 44 precharged before flight and/or powered via the combustion engine 40.

It will be appreciated, however, that in other exemplary embodiments, the clutch of the coupling unit 148 may instead be a two-way clutch actuatable between an engaged position and a disengaged position. When in the engaged position, the fan shaft 126 may rotate with the aft output shaft 118 of the turboshaft engine (via an intermediate shaft 150). By contrast, when in the disengaged position, the aft output shaft 118 of the turboshaft engine may rotate independently of the fan shaft 126. For example, in certain embodiments, the aircraft 10 may move the clutch to the disengaged position during, e.g., vertical takeoff, vertical landing, or hover operations wherein forward thrust is not required from the forward thrust propulsor 34. However, when the aircraft 10 transitions to forward thrust operations, such as cruise operations, the clutch may be moved to the engaged position to allow the forward thrust propulsor 34 to generate forward thrust for the aircraft 10.

Further still, the aircraft 10 additionally includes a speed change mechanism 152, with turboshaft engine being mechanically coupled to the forward thrust propulsor 34 through the speed change mechanism 152. More specifically, for the embodiments of FIGS. 6 through 8, the speed change mechanism 152 is configured as a gearbox. More specifically, the speed change mechanism 152 may be configured as a planetary gear box. Further, in still other embodiments, any other suitable speed change mechanism 152 may be utilized. For example, in other exemplary embodiments, speed change mechanism 152 may be a transmission, such that the combustion engine 40 is mechanically coupled to the forward thrust propulsor 34 through the transmission. More specifically, in certain embodiments, the transmission may be one of a continuously variable transmission or a hydraulic transmission.

It will be appreciated that although for the embodiments depicted the aircraft 10 includes the speed change mechanism 152 located forward of the coupling unit 148, in other embodiments, the relative location of these components may be reversed (which, e.g., may reduce a wear on the speed change mechanism 152 when, e.g., the coupling unit 148 decouples the two shafts 118, 126). Further, although the exemplary aircraft 10 depicted includes a speed change mechanism 152, a coupling unit 148, and a forward thrust propulsor 34 having a variable pitch fan, in other exemplary embodiments, the aircraft 10 may not include each or any of these components/features.

In other embodiments, the aircraft 10 may rely on a variability of a pitch of the fan 124 of the forward thrust propulsor 34 for neutralizing any forward thrust from the forward thrust propulsor 34 during, e.g., vertical takeoff and vertical landing operations (discussed in more detail below). Additionally, or alternatively, in other embodiments, the aircraft 10 may rely on the coupling unit 148 to neutralize a forward thrust from the forward thrust propulsor 34 during vertical takeoff and vertical landing operations (e.g., by including an actuatable clutch/two-way clutch). With such an embodiment, the aircraft 10 may therefore include a fixed pitch fan with the forward thrust propulsor 34. Additionally, or alternatively, still, in other embodiments, the aircraft 10 may rely on the speed change mechanism 152, such as a continuously variable transmission (such as an infinitely variable transmission), to substantially neutralize a forward thrust from the forward thrust propulsor 34 during vertical takeoff and landing operations. With such an embodiment, the aircraft 10 may therefore omit the coupling unit 148 and further may include a fixed pitch fan with the forward thrust propulsor 34. Further, in still other embodiments, any other suitable combination of these three components/features may be utilized. Still other embodiments and combinations are contemplated as well.

Still referring to FIGS. 6 through 8, it will further be appreciated that for the embodiment depicted, the forward thrust propulsor 34 may be mounted to the aircraft 10, such as to the fuselage 18 of the aircraft 10 or the casing 19 of the combustion engine 40, at an aft end 22 of the aircraft 10. The forward thrust propulsor 34 defines an axial direction A extending along the length of the combustion engine 40 and a radial direction R extending out relative to the axial direction A. As seen particularly in FIGS. 6 and 7, the forward thrust propulsor 34 may be a ducted fan including the outer nacelle 130 and one or more struts 159, or other structural members, extending between the outer nacelle 130 and the fuselage 18 of the aircraft 10 and/or the casing 19 of the combustion engine 40. In other embodiments, however, as seen in FIG. 8, the forward thrust propulsor may be a non-ducted fan without the outer nacelle 130. Moreover, the forward thrust propulsor 34 may be configured as a boundary layer ingestion fan defining an inlet 132 extending substantially 360 degrees around the fuselage 18 or the casing 19. In such a manner, the forward thrust propulsor 34 may ingest a boundary layer airflow over the fuselage 18 or the casing 19, and may re-energize such airflow to create a forward thrust for the aircraft 10. More specifically, the combination of the outer nacelle 130, the fuselage 18, and/or the casing 19 may at least partially define a fan air flowpath 77, with the fan 124 of the forward thrust propulsor 34 positioned at least partially within the fan air flowpath 77.

Further, the propulsor fan 124 of the forward thrust propulsor 34 includes a plurality of fan blades 134 coupled to a disk 136, with the disk 136 coupled to the fan shaft 126 via rotating fan frame 157. The fan blades 134 are arranged outside the core air flowpath 75 of the combustion gasses 76 exhausted from the combustion engine 40. In the illustrated embodiments, the combustion engine may be enclosed by the fuselage 18 and/or the casing 19. As such, the fuselage 18 or casing 19 may define an exterior surface 21, which for the embodiment shown defines in part the fan air flowpath 77. The plurality of fan blades 134 are arranged outside the exterior surface 21 of the casing 19 of the combustion engine 40 and/or the fuselage 18. For example, the fan blades 134 may be arranged in the fan air flowpath 77 and outside of the core air flowpath 75, and more particularly, the exhaust path for the combustion gases 76 substantially along the radial direction R of the forward thrust propulsor 34. The combustion engine 40 may include an outlet 79 at the end of the core air flowpath 75 for exhausting the combustion gases 76. The outlet 79 may be positioned inward of the fan blades 134 in the radial direction R and downstream, aft, or both of the fan blades 134 in the axial direction A. As such, the fan blades 134 are arranged outside of the combustion gases 76 exiting the outlet 79. Additionally, the fan blades 134 may be position aft, downstream, or both of the turbine section of the combustion engine 40 in the axial direction A. More specifically, as seen in FIG. 6, the fan blades 134 are located aft of both the high pressure turbine 104 and the lower pressure turbine 106.

As seen particularly in FIGS. 7 and 8, the rotating fan frame 157 may include rotors 78 along a length of the rotating fan frame 157 extending through the core air flowpath 75. More specifically, the rotors 78 are arranged in the exhaust stream of the combustion gasses 76. As such, the rotors 78 may extract additional energy from the exhausted combustion gasses 76 to drive the forward thrust propulsor 34.

Further still, in the embodiments shown, the aircraft 10 may include a tail cone 23 at an aft end of the combustion engine 40 defining an aft end of the core air flowpath 75. More specifically, the tail cone 23 may be coupled to the fan shaft 126, the coupling unit 148 or both in order to allow the tail cone 23 to rotate about the fan axis 128. As such, the tail cone may rotate with the propulsor fan 124 at the same rotational rate. In another embodiment, the tail cone 23 may be coupled to the intermediary shaft 150, the speed change mechanism 152, or both in order to allow the tail cone 23 to rotate about fan axis 123 at the same rotational rate as the intermediary shaft 150.

For the embodiments depicted, the forward thrust propulsor 34 is configured as a variable pitch propulsor. More specifically, each of the plurality of fan blades 134 are rotatably coupled to the disk 136 about a respective pitch axis 138. The forward thrust propulsor 34 further includes a pitch change mechanism 140 operable with each of the plurality of fan blades 134 to rotate each of the plurality of fan blades 134 about their respective pitch axes 138, e.g., in unison. The pitch change mechanism 140 may be located anywhere between the fan shaft 126 and the fan blades 134. For example, as seen in FIG. 6, the pitch change mechanism 140 may be located at the fan shaft 126. In another embodiment, as seen in FIG. 7, the pitch change mechanism 140 may be located inward of the fuselage 18 and/or the casing 19 along the radial direction R. More specifically, for the embodiment of FIG. 7, the pitch change mechanism 140 is located inward of the fan air flowpath 77 along the radial direction R and outward of the core air flowpath 75 along the radial direction R. Still in a further embodiment, as seen in FIG. 8, the pitch change mechanism 140 may be located outside the fuselage 18 and/or casing 19 along the radial direction R. More specifically, the pitch change mechanism 140 may be located in the fan air flowpath 77.

Figure 9:
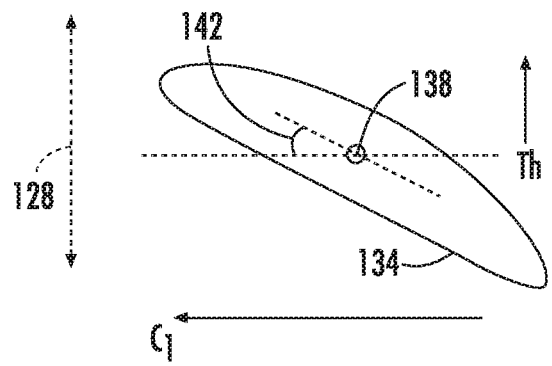
FIG. 9 is a schematic, axial view of a fan blade in accordance with an exemplary embodiment of the present disclosure in a first position.
Figure 10:
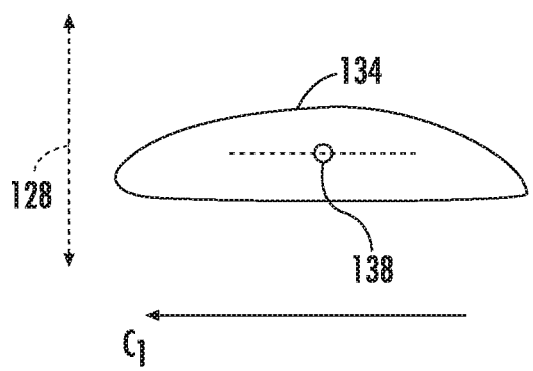
FIG. 10 is a schematic, axial view of the exemplary fan blade of FIG. 9 in a second position.
Figure 11:
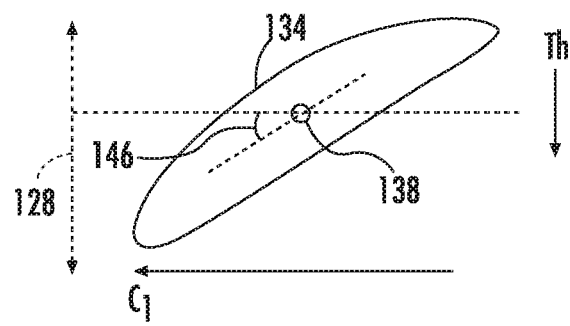
FIG. 11 is a schematic, axial view of the exemplary fan blade of FIG. 9 in a third position.

As will be appreciated, changing a pitch of the plurality of fan blades 134 may allow for a modification of an amount of thrust generated by the forward thrust propulsor 34 during operation without requiring a change in a rotational speed of the fan 124. For example, referring generally to FIGS. 9 through 11, three views of a fan blade 134 of the plurality of fan blades 134 of the forward thrust propulsor 34 are provided, each along the pitch axis 138 of the fan blade 134. For the embodiment of FIG. 9, the fan is in a first position defining a first pitch angle 142 relative to a first circumferential direction C1. The first pitch angle 142 may be a positive angle relative to the first circumferential direction C1. When the plurality of fan blades 134 of the propulsor fan 124 are rotated in a first circumferential direction C1 (with the plurality of fan blades 134 of the propulsor fan 124 defining the first pitch angle 142), the fan 124 generates a forward thrust. By contrast, FIG. 10 depicts the propulsor fan 124 in a second position wherein the fan blades 134 define a second pitch angle (not labeled) relative to the first circumferential direction C1. The second pitch angle may be substantially equal to 0. When the plurality of fan blades 134 of the propulsor fan 124 are rotated in the first circumferential direction C1 (with the plurality of fan blades 134 defining the second pitch angle), the propulsor fan 124 generates substantially no thrust. Further, FIG. 11 depicts the propulsor fan 124 in a third position defining a third pitch angle 146 relative to the first circumferential direction C1. The third pitch angle 146 may be a negative pitch angle relative to the circumferential direction C1. When the plurality of fan blades 134 of the propulsor fan 124 are rotated in the first circumferential direction C1 (with the plurality of fan blades 134 of the propulsor fan 124 defining the third pitch angle 146), the propulsor fan 124 generates a reverse thrust.

In such a manner, it will be appreciated that for the embodiment depicted, the propulsor fan 124 defines a pitch range (i.e., a range of pitch angles) enabling the variable pitch fan 124 to generate a forward thrust, a reverse thrust, and substantially no thrust during operation. Accordingly, such may allow for greater control of the aircraft 10 in, e.g., a hover mode or other vertical flight mode, and may also allow for electric power generation through the aft fan in forward flight by operating it in a wind turbining mode.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft defining a vertical direction and a transverse direction, the aircraft comprising:
   a fuselage;
   a wing extending from the fuselage; and
   a hybrid-electric propulsion system, the hybrid-electric propulsion system comprising:
      a power source comprising a combustion engine and an electric generator, the
   combustion engine defining a flowpath for exhausting combustion gases rearwardly of the fuselage;
      a plurality of vertical thrust electric fans arranged along the wing and driven by the power source; and
      a forward thrust propulsor mechanically coupled to the combustion engine through an output shaft extending aft of a turbine section of the combustion engine, the output shaft fixedly coupled to and coaxial with a low-pressure spool of the turbine section with a portion of the combustion engine and the output shaft each housed within a tail cone inwardly of the flowpath of the combustion engine, wherein the forward thrust propulsor comprises a propulsor fan having a plurality of fan blades, the plurality of fan blades arranged outside of the flowpath of the combustion engine for exhausting combustion gases and coupled with a fan frame extending through the tail cone, the flowpath, and the fuselage.

2. The aircraft of claim 1, wherein the combustion engine comprises a casing defining an exterior surface, wherein the plurality of fan blades of the propulsor fan are arranged outside the exterior surface of the casing of the combustion engine.

3. The aircraft of claim 1, wherein the forward thrust propulsor is configured as a variable pitch propulsor.

4. The aircraft of claim 3, wherein the forward thrust propulsor comprises an outer nacelle at least partially defining a fan air flowpath and further comprising a pitch change mechanism, and wherein the pitch change mechanism is positioned inward of the fan air flowpath and outward of the flowpath of the combustion engine.

5. The aircraft of claim 3, wherein the variable pitch propulsor defines a pitch range enabling the forward thrust propulsor to generate forward thrust, reverse thrust, and substantially no thrust during operation.

6. The aircraft of claim 1, wherein the combustion engine defines an outlet positioned inward of the plurality of fan blades in a substantially radial direction and aft of the plurality of fan blades in a substantially axial direction.

7. The aircraft of claim 1, wherein the plurality of fan blades are positioned aft of the turbine section of the combustion engine along an axial direction through the fan frame, and wherein the fan frame is coupled with a pitch change mechanism aft of the turbine section of the combustion engine along the axial direction.

8. The aircraft of claim 1, wherein the combustion engine is a turboshaft engine.

9. The aircraft of claim 8, wherein the turboshaft engine comprises an output shaft, wherein the forward thrust propulsor comprises a fan shaft, and wherein the output shaft is selectively or permanently mechanically coupled to the fan shaft.

10. The aircraft of claim 1, wherein the forward thrust propulsor is mounted to the fuselage of the aircraft at an aft end of the aircraft.

11. The aircraft of claim 1, wherein the hybrid-electric propulsion system further comprises a speed change mechanism, and wherein the combustion engine is mechanically coupled to the forward thrust propulsor through the speed change mechanism.

12. The aircraft of claim 1, wherein the power source further comprises an electric energy storage unit, and wherein each of the plurality of vertical thrust electric fans is electrically coupled to and driven by at least one of the electric generator or the electric energy storage unit.

13. The aircraft of claim 12, wherein the power source further comprises an electric motor, wherein the electric motor is electrically coupled to and driven by the electric energy storage unit, and wherein the electric motor is coupled to and configured to drive the forward thrust propulsor.

14. The aircraft of claim 1, wherein the wing is a first wing extending from a first side of the fuselage, wherein the plurality of vertical thrust electric fans is a first plurality of vertical thrust electric fans, and wherein the aircraft further comprises:
   a second wing coupled to and extending from an opposing second side of the fuselage, wherein the hybrid-electric propulsion system further comprises a second plurality of vertical thrust electric fans integrated into the second wing and oriented to generate thrust along the vertical direction, the second plurality of vertical thrust electric fans arranged along a length of the second wing.

15. The aircraft of claim 1, wherein the wing is a first wing, wherein the plurality of vertical thrust electric fans of the hybrid-electric propulsion system is a first plurality of vertical thrust electric fans, and wherein the aircraft further comprises:
   a second wing, a third wing, and a fourth wing, wherein the hybrid-electric propulsion system further comprises a second plurality of vertical thrust electric fans integrated into the second wing and arranged along a length of the second wing, a third plurality of vertical thrust electric fans integrated into the third wing and arranged along a length of the third wing, and a fourth plurality of vertical thrust electric fans integrated into the fourth wing and arranged along a length of the fourth wing, wherein each of the second plurality of vertical thrust electric fans, the third plurality of vertical thrust electric fans, and fourth plurality of vertical thrust electric fans are oriented to generate thrust along the vertical direction.

16. The aircraft of claim 1, further comprising:
one or more rotors within the flowpath for exhausting combustion gases, wherein the one or more rotors extract additional energy from the combustion gasses.

17. A hybrid-electric propulsion system for an aircraft comprising:
a power source comprising a combustion engine and an electric machine, the combustion engine defining a flowpath for exhausting combustion gases;
a plurality of vertical thrust electric fans driven by the power source; and
a forward thrust propulsor, the forward thrust propulsor selectively or permanently mechanically coupled to the combustion engine, the forward thrust propulsor comprising a propulsor fan having a plurality of fan blades, wherein the plurality of fan blades of the propulsor fan are arranged outside of the flowpath of the combustion engine for exhausting combustion gases, and wherein the electric machine is aft of a turbine of the combustion engine and overlaps with an outer nacelle at least partially defining a fan air flowpath.

18. The hybrid-electric propulsion system of claim 17, wherein the combustion engine comprises a casing defining an exterior surface, wherein the plurality of fan blades of the propulsor fan are arranged outside the exterior surface of the casing of the forward thrust propulsor.

19. The hybrid-electric propulsion system of claim 17, wherein the forward thrust propulsor is configured as a variable pitch propulsor, the variable pitch propulsor further comprising at least one pitch change mechanism, wherein the variable pitch propulsor defines a pitch range enabling the forward thrust propulsor to generate forward thrust, reverse thrust, and substantially no thrust during operation.

20. An aircraft defining a vertical direction and a transverse direction and having a hybrid-electric propulsion system, the hybrid-electric propulsion system comprising:
a power source comprising a combustion engine and an electric machine, the combustion engine defining a flowpath for exhausting combustion gases, wherein the combustion engine includes a low pressure shaft driving a forward output shaft that is further coupled to the electric machine, and wherein the low pressure shaft and the forward output shaft are generally co-axial along a fan axis;
a plurality of vertical thrust electric fans arranged along a wing of the aircraft and driven by the power source; and
a forward thrust propulsor, the forward thrust propulsor mechanically coupled to the combustion engine through an aft output shaft, the forward thrust propulsor comprising a propulsor fan having a plurality of fan blades operably coupled to a fan frame, the plurality of fan blades arranged outside of the flowpath of the combustion engine for exhausting combustion gases and the fan frame extending through the flowpath of the combustion engine for exhausting combustion gases.

* * * * *